(12) United States Patent
Abe

(10) Patent No.: US 12,090,742 B2
(45) Date of Patent: Sep. 17, 2024

(54) THERMALLY-INSULATING SHEET AND METHOD OF MANUFACTURING SAME

(71) Applicant: Panasonic Intellectual Property Management Co., Ltd., Osaka (JP)

(72) Inventor: Yuuichi Abe, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 767 days.

(21) Appl. No.: 16/326,693

(22) PCT Filed: Oct. 12, 2017

(86) PCT No.: PCT/JP2017/036939
§ 371 (c)(1),
(2) Date: Feb. 19, 2019

(87) PCT Pub. No.: WO2018/100897
PCT Pub. Date: Jun. 7, 2018

(65) Prior Publication Data
US 2019/0202167 A1   Jul. 4, 2019

(30) Foreign Application Priority Data
Nov. 30, 2016   (JP) ................. 2016-232600

(51) Int. Cl.
*B32B 5/24*   (2006.01)
*B32B 9/00*   (2006.01)
(Continued)

(52) U.S. Cl.
CPC ............... *B32B 5/245* (2013.01); *B32B 5/24* (2013.01); *B32B 9/00* (2013.01); *B32B 9/045* (2013.01);
(Continued)

(58) Field of Classification Search
CPC .. B32B 5/245; B32B 9/00; B32B 9/04; B32B 9/047; B32B 2307/304; D06M 11/79; F16L 59/00; F16L 59/04
See application file for complete search history.

(56) References Cited

U.S. PATENT DOCUMENTS 4,232,620 A * 11/1980 Kurz ................ B29C 70/086
112/420
2005/0249931 A1* 11/2005 Utsumi ............... B32B 5/022
428/218
(Continued)

FOREIGN PATENT DOCUMENTS

| CN | 101680222 A | 3/2010 |
|---|---|---|
| JP | 7-197365 | 8/1995 |
| JP | H07-197365 A | 8/1995 |

OTHER PUBLICATIONS

International Search Report of PCT application No. PCT/JP2017/036939 dated Nov. 21, 2017.
(Continued)

*Primary Examiner* — Joanna Pleszczynska
(74) *Attorney, Agent, or Firm* — Rimon P.C.

(57) ABSTRACT

A thermally-insulating sheet includes a thermal insulator which includes a fiber sheet made of fibers providing spaces among the fibers, a resin layer provided on a part of a surface of the fiber sheet, the first resin having a denser surface than the fiber sheet, and a silica xerogel held in the spaces of the fiber sheet. The thermally-insulating sheet further includes a protective sheet bonded onto the resin layer so as to cover the thermal insulator and to cover the surface of the fiber sheet. This thermally-insulating sheet hardly break even if having a large size.

25 Claims, 1 Drawing Sheet

(51) Int. Cl.
*B32B 9/04* (2006.01)
*C01B 33/16* (2006.01)
*D06M 11/79* (2006.01)
*F16L 59/00* (2006.01)
*F16L 59/04* (2006.01)
*F16L 59/02* (2006.01)
*F16L 59/065* (2006.01)

(52) U.S. Cl.
CPC .............. *B32B 9/047* (2013.01); *C01B 33/16* (2013.01); *D06M 11/79* (2013.01); *F16L 59/026* (2013.01); *F16L 59/029* (2013.01); *F16L 59/04* (2013.01); *F16L 59/065* (2013.01)

(56) References Cited

U.S. PATENT DOCUMENTS

2008/0229704 A1    9/2008  Augustyniak et al.
2016/0339670 A1*  11/2016  Faotto ....................... E04B 1/80

OTHER PUBLICATIONS

English Translation of Chinese Office Action dated Oct. 20, 2020 for the related Chinese Patent Application No. 201780057574.4.

* cited by examiner

THERMALLY-INSULATING SHEET AND METHOD OF MANUFACTURING SAME

CROSS-REFERENCE TO RELATED APPLICATIONS

This application is a U.S. national stage application of the PCT international application No. PCT/JP2017/036939 filed on Oct. 12, 2017, which claims the benefit of foreign priority of Japanese patent application No. 2016-232600 filed on Nov. 30, 2016, the contents all of which are incorporated herein by reference.

TECHNICAL FIELD

The present disclosure relates to a thermally-insulating sheet to be used for thermal insulation, and to a method of manufacturing the thermally-insulating sheet.

BACKGROUND ART

Energy-saving has been claimed vigorously in recent years. In a method for achieving the energy-saving, a device is provided with thermal insulation so as to increase an energy efficiency. This thermal insulation utilizes a thermally-insulating sheet with excellent thermal-insulation effect.

For this purpose, a thermally-insulating sheet having a thermal conductivity lower than that of air may be used. This lower heat conductivity is exhibited by applying silica xerogel to a fiber sheet of this thermally-insulating sheet. A conventional thermally-insulating sheet similar to the above thermally-insulating sheet is disclosed, for instance, in PTL 1.

CITATION LIST

Patent Literature

PTL 1: Japanese Patent Laid-Open Publication No. 2011-136859

SUMMARY

A thermally-insulating sheet includes a thermal insulator which includes a fiber sheet made of fibers providing spaces among the fibers, a resin layer provided on a part of a surface of the fiber sheet, the first resin having a denser surface than the fiber sheet, and a silica xerogel held in the spaces of the fiber sheet. The thermally-insulating sheet further includes a protective sheet bonded onto the resin layer so as to cover the thermal insulator and to cover the surface of the fiber sheet.

This thermally-insulating sheet hardly break even if having a large size.

DETAIL DESCRIPTION OF PREFERRED EMBODIMENT

Figure 1:
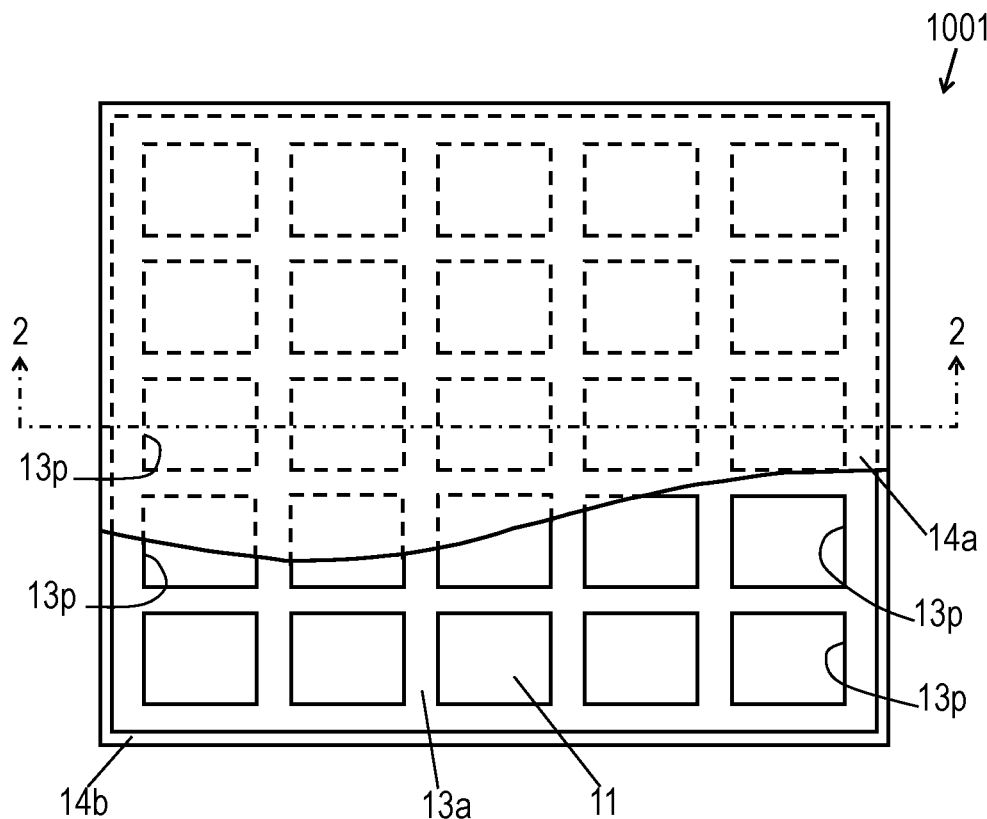
FIG. 1 is a top view of a thermally-insulating sheet in accordance with an exemplary embodiment.
Figure 2:
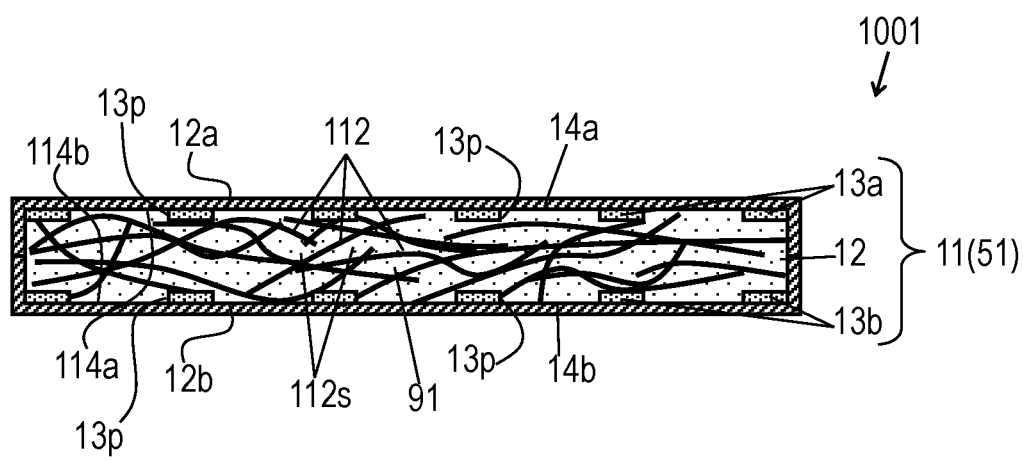
FIG. 2 is a sectional view of the thermally-insulating sheet along line 2-2 shown in FIG. 1.

FIG. 1 is a top view of thermally-insulating sheet 1001 in accordance with an exemplary embodiment. FIG. 2 is a sectional view of thermally-insulating sheet 1001 along line 2-2 shown in FIG. 1.

Thermally-insulating sheet 1001 includes thermal insulator 11 and protective sheets 14a and 14b which completely cover thermal insulator 11. FIG. 1 does not show a part of protective sheet 14a for illustrating the interior of thermally-insulating sheet 1001. Thermal insulator 11 includes fiber sheet 12 having spaces 112s provided inside thereof, dense resin layer 13a provided on a part of surface 12a of fiber sheet 12, dense resin layer 13b provided on a part of surface 12b of fiber sheet 12, and silica xerogel 91 held in the spaces of fiber sheet 12. Fiber sheet 12 is made of fibers 112 disposed such that spaces 112s are provided among fibers 112. Fiber sheet 12 has a thickness of about 1 mm. Fibers 112 are made of polyethylene terephthalate (PET) with an average diameter of about 10 μm. The total volume of spaces 112s is about 90% of the volume of fiber sheet 12. Spaces 112s inside the fiber sheet 12 are filled with silica xerogel 91. Since silica xerogel 91 has fine spaces of nanometer size provided inside, the thermal conductivity of thermal insulator 11 ranges from 0.018 to 0.024 W/m·K, which is lower than the thermal conductivity of air. Silica xerogel 91 refers to a broader sense including a xerogel in which gel is dried, so that it can be obtained not only by a method of ordinary drying, but also by supercritical drying, or freeze drying.

Resin layers 13a and 13b are provided on surfaces 12a and 12b of fiber sheet 12 opposite to each other, respectively. Each of these layers 13a and 13b has a lattice shape and a thickness of about 0.03 mm, and has a dense surface disabling a liquid to permeate fiber sheet 12. In accordance with this embodiment, resin layers 13a and 13b disable liquid containing silica xerogel 91 per se or sol forming silica xerogel 91 to penetrate resin layers 13a and 13b and to pass through resin layers 13a and 13b. Resin layers 13a and 13b are made of polyethylene and have a melting point lower than that of PET of fiber sheet 12. This configuration allows fiber sheet 12 to bond to resin layers 13a and 13b by heat-seal thermal fusion. In the case where fiber sheet 12 is made of, for instance, glass fiber having no melting point, fiber sheet 12 may be made of material which can keep its shape without thermal decomposition at a temperature causing resin layers 13a and 13b to melt.

Fiber sheet 12 and resin layers 13a and 13b constitute base sheet 51. Resin films having a lattice shapes are heated and pressed onto surfaces 12a and 12b of fiber sheet 12, thereby providing resin layers 13a and 13b on respective parts of surfaces 12a and 12b of fiber sheet 12, respectively. Alternatively, resin layers 13a and 13b may be formed by placing melted resin is on surfaces 12a and 12b of fiber sheet 12, and then, applying a pressure thereto, thereby allowing the resin to permeate fiber sheet 12. The latter method provides resin layer 13a scattered on surface 12a as well as resin layer 13b scattered on surface 12b of fiber sheet 12.

Protective sheets 14a and 14b are bonded to respective ones of the both surfaces of thermal insulator 11. The protective sheets are made of PET and have thicknesses of about 20 μm. Surface 114a of protective sheet 14a facing thermal insulator 11 contacts resin layer 13a and surface 12a of fiber sheet 12. Surface 114b of protective sheet 14b facing insulator 11 contacts resin layer 13b and surface 12b of fiber sheet 12. Protective sheets 14a and 14b are provided with acrylic adhesive at least on surfaces 114a and 114b facing thermal insulator 11, so that protective sheets 14a and 14b are bonded to each other around thermal insulator 11. Protective sheet 14a is bonded to resin layer 13a with the acrylic adhesive at the surface of thermal insulator 11 while protective sheet 14b is bonded to resin layer 13b are bonded at the surface of thermal insulator 11 with the acrylic adhesive. Thermal insulator 11 is hardly bonded to protective sheets 14a and 14b at portions where silica xerogel 91 exposes. This configuration prevents silica xerogel 91 from adhering onto the dense surfaces of resin layers 13a and 13b, and allows protective sheets 14a and 14b to be readily bonded to resin layers 13a and 13b having bonded to fiber sheet 12. As a result, protective sheets 14a and 14b are fixed to fiber sheet 12 via resin layers 13a and 13b.

Resin layers 13a and 13b having excessively small areas may decrease the bonding strength to protective sheets 14a and 14b. In contrast, resin layers 13a and 13b having excessively large areas may prevents silica xerogel 91 from filling spaces 112s in fiber sheet 12. Each of the areas of resin layers 13a and 13b is preferably equal to or greater than 20% of the area of fiber sheet 12 and is equal to or less than 60% of the area of fiber sheet 12.

Resin layers 13a and 13b having excessively small thicknesses may decrease the bonding strength to protective sheets 14a and 14b. Resin layers 13a and 13b having excessively large thicknesses may decrease the spaces to be filled with silica xerogel 91, accordingly deteriorating the thermal insulation. Each of the thicknesses of resin layers 13a and 13b is preferably equal to or greater than 2% of the thickness of fiber sheet 12 and is equal to or less than 5% of the thickness of fiber sheet 12.

A method of manufacturing thermally-insulating sheet 1001 will be described below.

First, fiber sheet 12 made of PET having a thickness of about 1 mm is prepared. Resin films are placed on respective surfaces 12a and 12b of fiber sheet 12. The resin films become resin layers 13a and 13b. The resin films are made of polyethylene having thicknesses of about 0.03 mm. Openings 13p having square shapes are provided regularly in each resin film. The openings have sizes of about 3 mm square, and are arranged at intervals of about 10 mm. The melting point of fiber sheet 12 is about 120° C. while the melting point of the resin films is about 90° C.

Next, a pressing plate is pressed onto the resin film to apply a pressure. The temperature of the pressing plate is about 100° C., which is lower than the melting point of fiber sheet 12 and higher than the melting point of the resin film. The applied pressure softens or melts the resin film, so that the resin film is pushed to enter into fiber sheet 12. The temperatures of the resin films and fiber sheet 12 are restored to a room temperature, thereby forming dense resin layers 13a and 13b having the lattice shapes on surfaces 12 and, 12b of fiber sheet 12, respectively. This configuration allows resin layers 13a and 13b to adhere to fibers 112 of fiber sheet 12. The temperature of the pressing plate at which fiber sheet 12 does not melt allows fiber sheet 12 to maintain spaces 112s therein even when resin layers 13a and 13b are provided on surfaces 12a and 12b.

Then, fiber sheet 12 is immersed in sol made of, for instance, sodium silicate solution added with hydrochloric acid, so that the sol impregnates the inside spaces of fiber sheet 12. The sol flows through openings 13p provided in resin layers 13a and 13b, and enters into spaces 112s of fiber sheet 12. The sol entering into spaces 112s of fiber sheet 12 gels to become xerogel. The xerogel is hardly attached to surfaces of resin layers 13a and 13b. Even if the xerogel is attached to the surfaces of layers 13a and 13b, the attached xerogel can be removed easily. Next, xerogel 91 formed in space 112s is dehydrated and dried, thereby allowing silica xerogel 91 to fill spaces 112s of fiber sheet 12. These processes provide thermal insulator 11 including resin layers 13a and 13b on parts of the surfaces of thermal insulator 11. Thermal insulator 11 is filled with silica xerogel 91 in inside spaces 112s of fiber sheet 12.

Next, protective sheets 14a and 14b made of PET having thicknesses of about 20 μm are bonded to respective ones of both surfaces of thermal insulator 11. Protective sheets 14a and 14b are provided with acrylic adhesive at surfaces 114a and 114b facing thermal insulator 11. Protective sheets 14a and 14b have large sizes than thermal insulator 11, and are bonded to each other around thermal insulator 11. On the surfaces of thermal insulator 11, protective sheets 14a and 14b are bonded to resin layers 13a and 13b with the acrylic adhesive, respectively. This configuration allows thermal insulator 11 to be bonded to protective sheets 14a and 14b with resin layers 13a and 13b, thereby preventing protective sheets 14a and 14b from being peeled off from fiber sheet 12. As a result, in thermally insulating sheet 1001, protective sheets 14a and 14b hardly break. Protective sheets 14a and 14b may be bonded to each other around thermal insulator 11 by thermos-compression bonding.

The conventional thermally-insulating sheet discussed previously is poor in adhesive properties, and the silica xerogel can be readily removed from this sheet. Protective sheets are thus needed to overcome this removal.

A thermally-insulating sheet has a large size tends to allow the protective sheets to be peeled off, so that the protective sheets become fragile.

Thermally-insulating sheet 1001 in accordance with this embodiment prevents protective sheets 14a and 14b from being peeled off from fiber sheet 12, and accordingly, prevents protective sheets 14a and 14b from breaking.

Fiber sheet 12 may be made of, for instance, glass fiber excellent in incombustibility. In this case, resin layers 13a and 13b may be made of material, such as PET, having a high melting point. This material provides thermally-insulating sheet 1001 with high heat resistance.

REFERENCE MARKS IN THE DRAWINGS 11 thermal insulator
12 fiber sheet
13a resin layer (first resin layer)
13b resin layer (second resin layer)
14a protective sheet (first protective sheet)
14b protective sheet (second protective sheet)

The invention claimed is:

1. A thermally-insulating sheet comprising:
   a thermal insulator including:
      a fiber sheet made of a plurality of fibers disposed so as to have spaces among the plurality of fibers, the fiber sheet having a first surface and a second surface opposite to each other;
      a first resin layer provided on a part of the first surface of the fiber sheet, the first resin layer being made of a material denser than the fiber sheet;
      a second resin layer provided on a part of the second surface of the fiber sheet, the second resin layer being made of a material denser than the fiber sheet; and
      a silica xerogel held in the spaces of the fiber sheet;
   a first protective sheet bonded onto the first resin layer so as to cover the thermal insulator and to contact the first surface of the fiber sheet; and
   a second protective sheet bonded onto the second resin layer so as to contact the second surface of the fiber sheet wherein:
   the first resin layer has openings and a remaining portion other than the openings of the first resin layer, the remaining portion of the first resin layer being made of the material denser than the fiber sheet, the second resin layer has openings and a remaining portion other than the openings of the second resin layer, the remaining portion of the second resin layer being made of the material denser than the fiber sheet, and the remaining portion of the first resin layer and the remaining portion of the second resin layer disable a liquid to pass through the first resin layer and the second resin layer.

2. The thermally-insulating sheet of claim 1, wherein a melting point of the first resin layer and a melting point of the second resin layer are lower than a melting point of the fiber sheet.

3. The thermally-insulating sheet of claim 1, wherein the first resin layer has a lattice shape.

4. The thermally-insulating sheet of claim 3, wherein the second resin layer has a lattice shape.

5. The thermally-insulating sheet of claim 1, wherein an area of the first resin layer is equal to or greater than 20% of an area of the first surface of the fiber sheet, and is equal to or less than 60% of the area of the first surface of the fiber sheet.

6. The thermally-insulating sheet of claim 5, wherein an area of the second resin layer ranges is equal to or greater than 20% of an area of the second surface of the fiber sheet, and is equal to or less than 60% of the area of the second surface of the fiber sheet.

7. The thermally-insulating sheet of claim 1, wherein a thickness of the first resin layer is equal to or greater than 2% of a thickness of the fiber sheet, and is equal to or less than 5% of the thickness of the fiber sheet.

8. The thermally-insulating sheet of claim 7, wherein a thickness of the second resin layer is equal to or greater than 2% of the thickness of the fiber sheet, and is equal to or less than 5% of the thickness of the fiber sheet.

9. The thermally-insulating sheet of claim 1, wherein the first resin layer and the second resin layer disable a liquid to pass through the first resin layer and the second resin layer.

10. The thermally-insulating sheet of claim 1, wherein the second protective sheet is bonded to the first protective sheet around the thermal insulator.

11. The thermally-insulating sheet of claim 1, wherein at least a part of the first resin layer penetrates into the fiber sheet.

12. The thermally-insulating sheet of claim 11, wherein at least a part of the second resin layer penetrates into the fiber sheet.

13. The thermally-insulating sheet of claim 1, wherein the second resin layer is thermally fused to the fiber sheet.

14. The thermally-insulating sheet of claim 13, wherein the second resin layer is thermally fused to the fiber sheet.

15. The thermally-insulating sheet of claim 1, wherein part of the fiber sheet penetrates into the openings of the first resin layer and the openings of the second resin layer.

16. The thermally-insulating sheet of claim 1,
wherein the first protective sheet contacts the first surface of the fiber sheet through the openings of the first resin layer, and
wherein the second protective sheet contacts the second surface of the fiber sheet through the openings of the second resin layer.

17. A thermally-insulating sheet comprising:
a thermal insulator including:
a fiber sheet made of a plurality of fibers and having spaces therein,
a resin layer provided on at least a part of a surface of the fiber sheet, the resin layer being made of a material denser than the fiber sheet, and
a silica xerogel disposed in the spaces of the fiber sheet; and
a protective sheet bonded onto the resin layer so as to cover the thermal insulator and to contact the surface of the fiber sheet, wherein:
the resin layer has openings and a remaining portion other than the openings of the resin layer, the remaining portion of the resin layer being made of the material denser than the fiber sheet, and
the remaining portion of the resin layer disables a liquid to pass through the resin layer.

18. The thermally-insulating sheet of claim 17, wherein at least a part of the resin layer penetrates into the fiber sheet.

19. The thermally-insulating sheet of claim 17, wherein a melting point of the resin layer is lower than a melting point of the fiber sheet.

20. The thermally-insulating sheet of claim 17, wherein the resin layer is thermally fused to the fiber sheet.

21. The thermally-insulating sheet of claim 17, wherein the resin layer has a lattice shape.

22. The thermally-insulating sheet of claim 17, wherein an area of the resin layer is equal to or greater than 20% of an area of the surface of the fiber sheet, and is equal to or less than 60% of the area of the surface of the fiber sheet.

23. The thermally-insulating sheet of claim 17, wherein a thickness of the resin layer is equal to or greater than 2% of a thickness of the fiber sheet, and is equal to or less than 5% of the thickness of the fiber sheet.

24. The thermally-insulating sheet of claim 17, wherein part of the fiber sheet penetrates into the openings of the resin layer.

25. The thermally-insulating sheet of claim 17, wherein the protective sheet contacts the surface of the fiber sheet through the openings of the resin layer.

* * * * *